Jan. 2, 1945.   M. E. BRENDEL   2,366,432
WEIGHING APPARATUS
Filed Aug. 3, 1940   11 Sheets-Sheet 1

Inventor:
Max E. Brendel
By Roland C. Rehm
Atty.

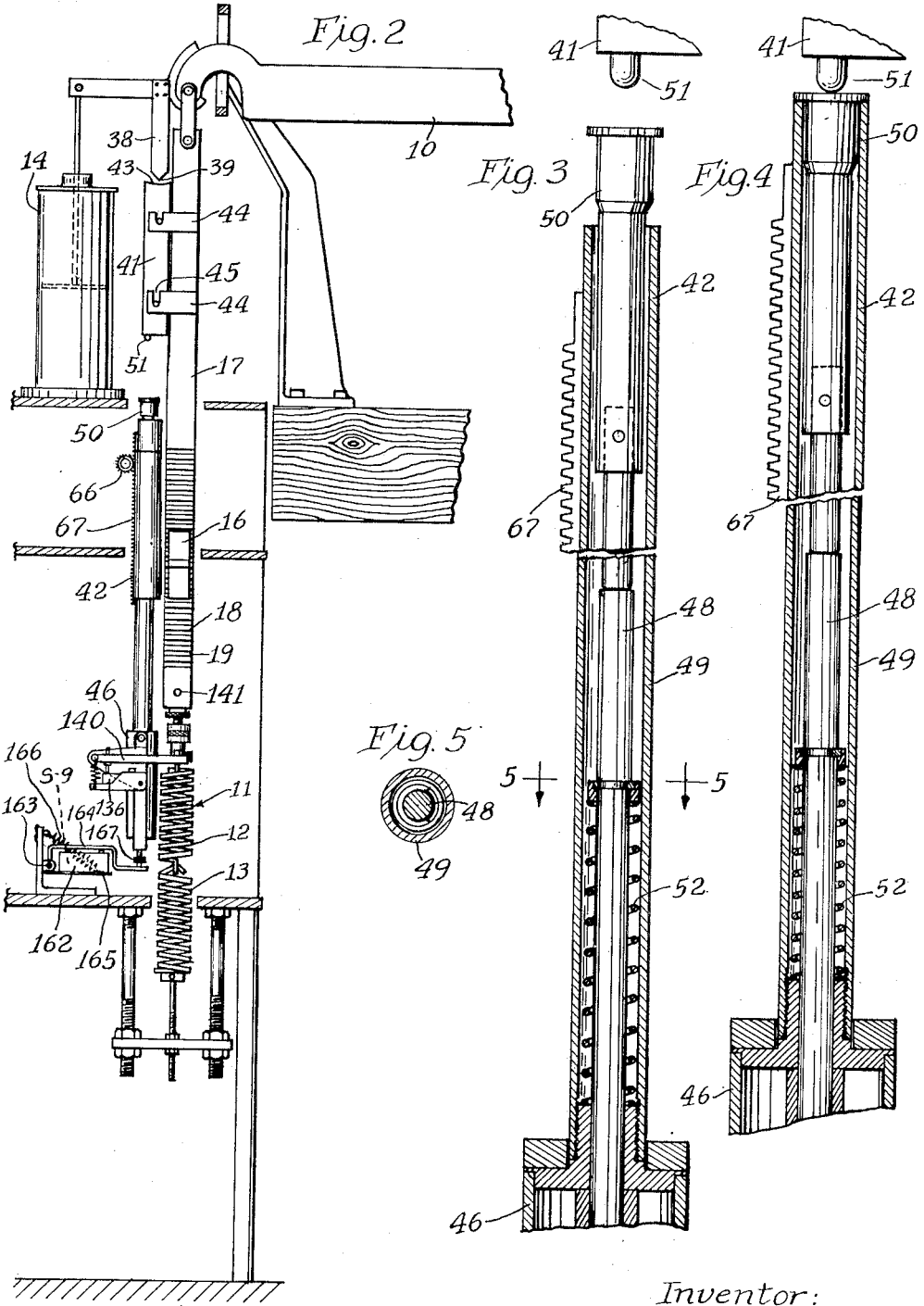

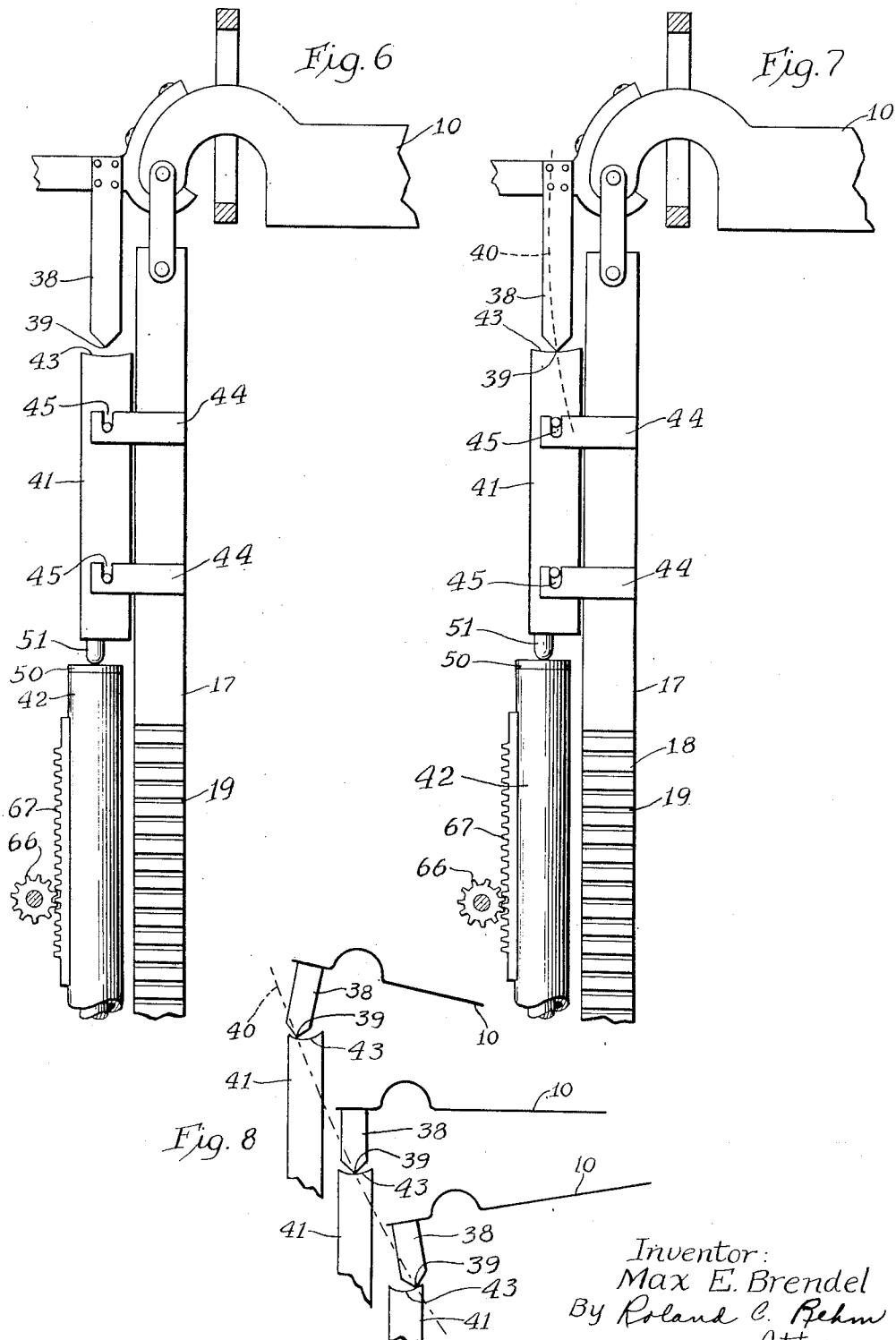

Jan. 2, 1945.     M. E. BRENDEL     2,366,432
WEIGHING APPARATUS
Filed Aug. 3, 1940     11 Sheets-Sheet 4
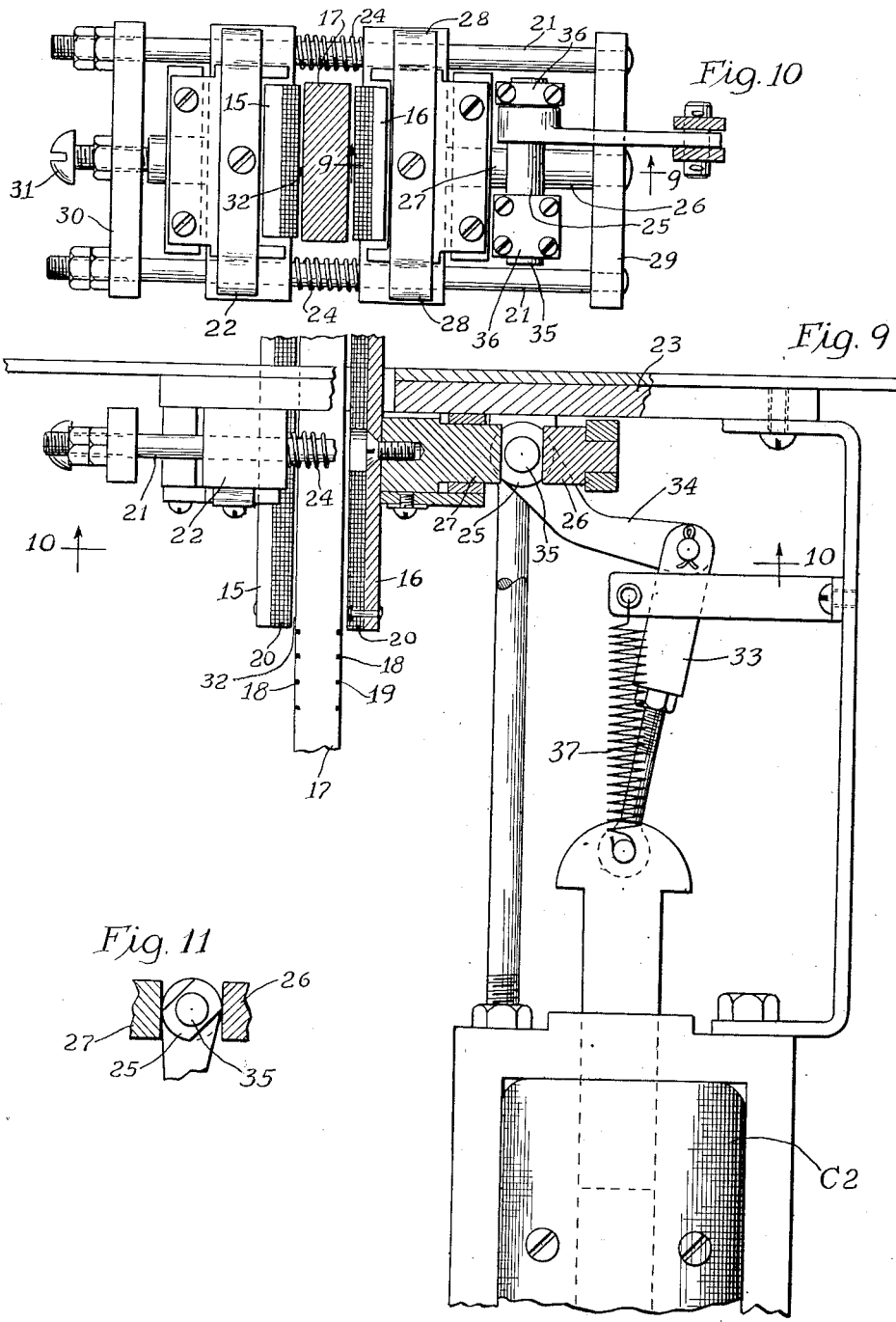
Inventor:
Max E. Brendel
By Roland C. Rehm
Atty.

Jan. 2, 1945.　　　M. E. BRENDEL　　　2,366,432
WEIGHING APPARATUS
Filed Aug. 3, 1940　　11 Sheets-Sheet 5
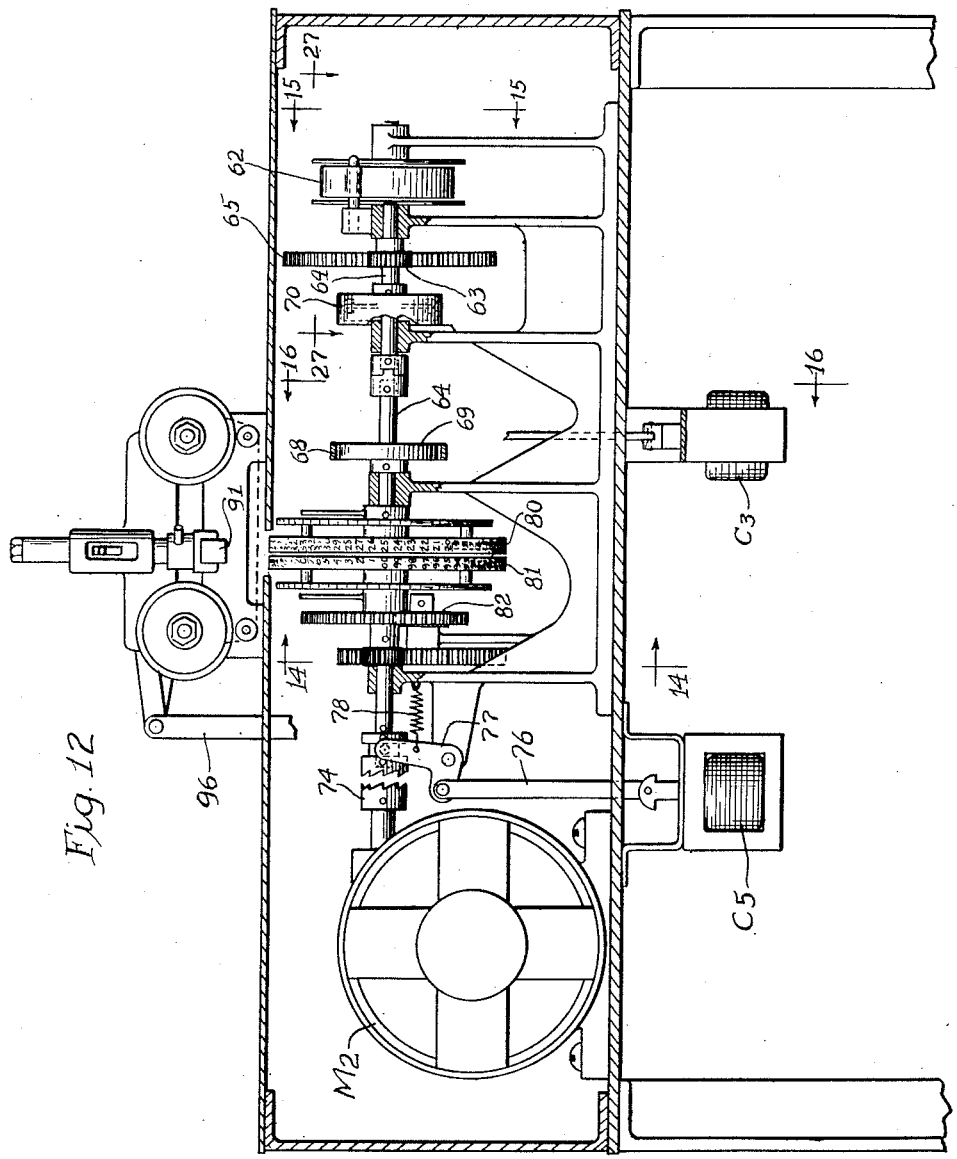
Inventor:
Max E. Brendel
By Roland C. Rehm
Atty.

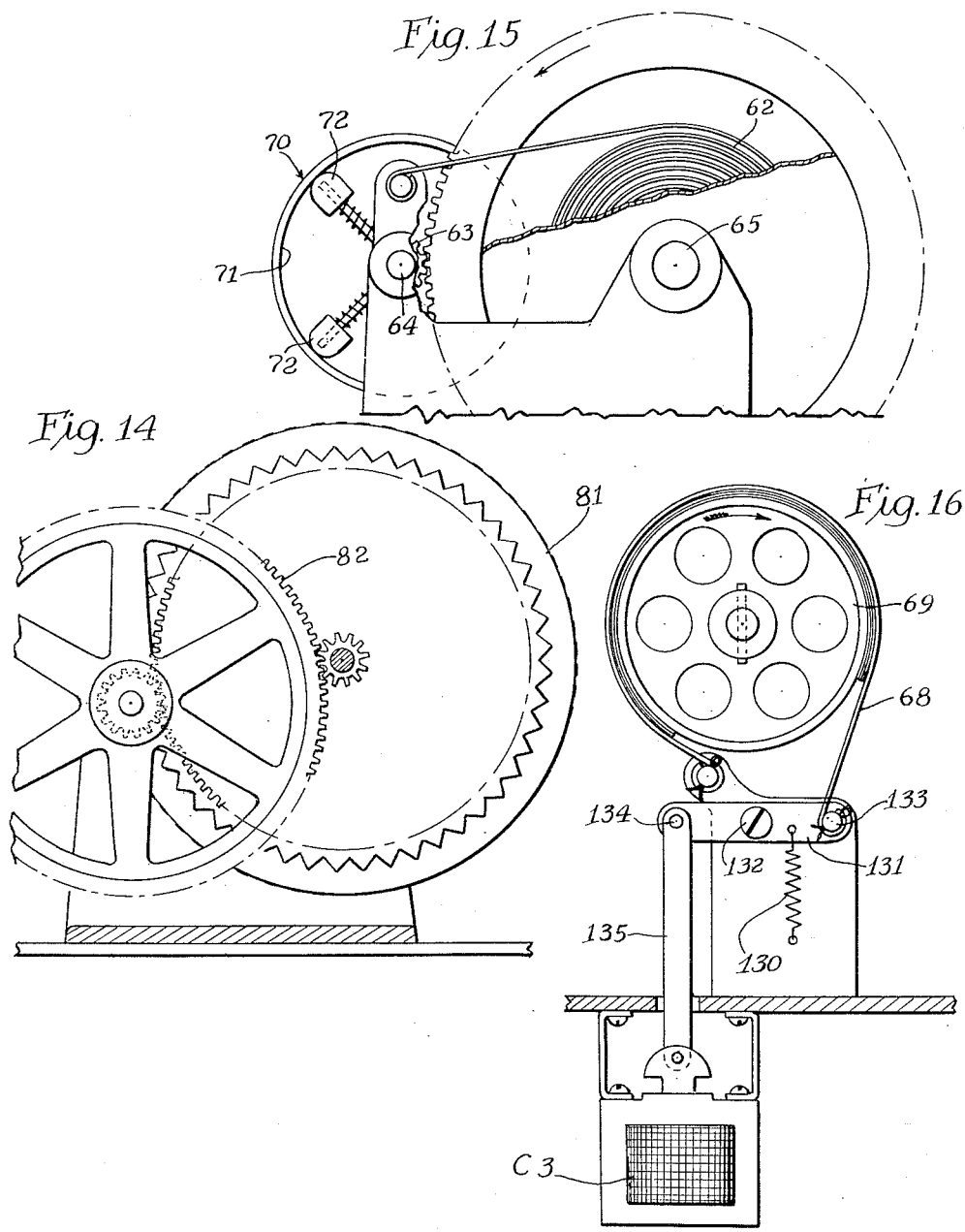

Jan. 2, 1945.  M. E. BRENDEL  2,366,432
WEIGHING APPARATUS
Filed Aug. 3, 1940  11 Sheets-Sheet 8
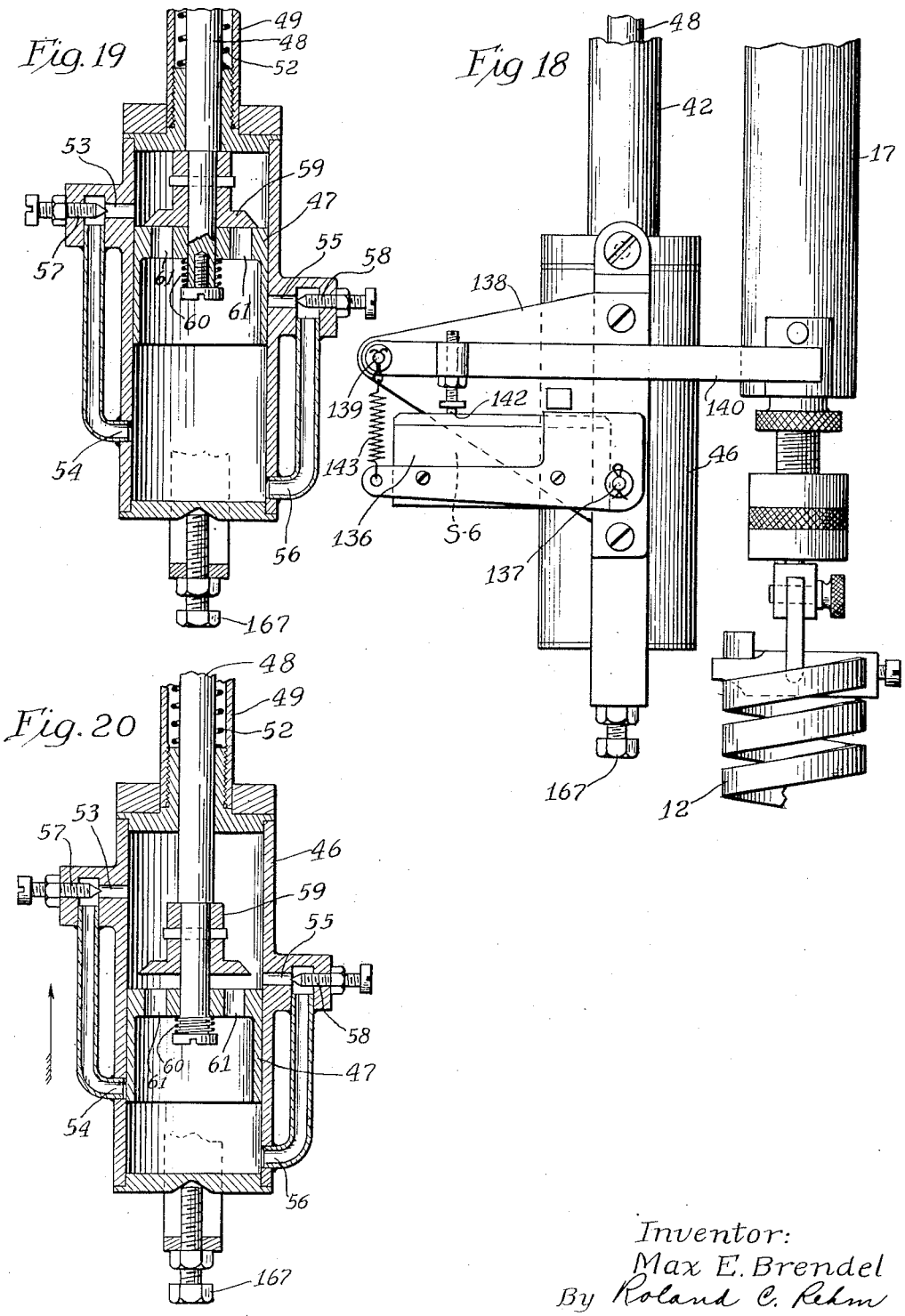
Inventor:
Max E. Brendel
By Roland C. Rehm
Atty.

Jan. 2, 1945. M. E. BRENDEL 2,366,432
WEIGHING APPARATUS
Filed Aug. 3, 1940 11 Sheets-Sheet 9

Inventor:
Max E. Brendel
By Roland C. Rehm
Atty.

Inventor:
Max E. Brendel
By Roland C Rehm
Atty.

Jan. 2, 1945.                    M. E. BRENDEL                    2,366,432
                                WEIGHING APPARATUS
                   Filed Aug. 3, 1940                11 Sheets-Sheet 11
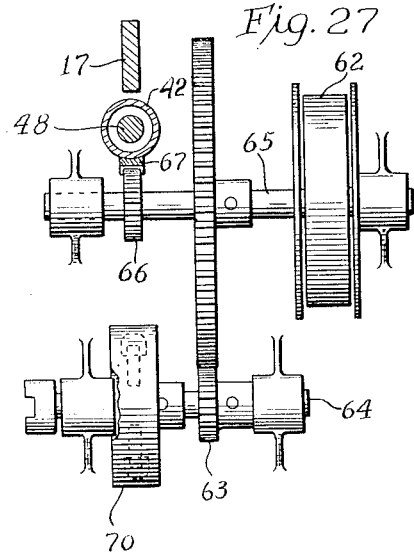
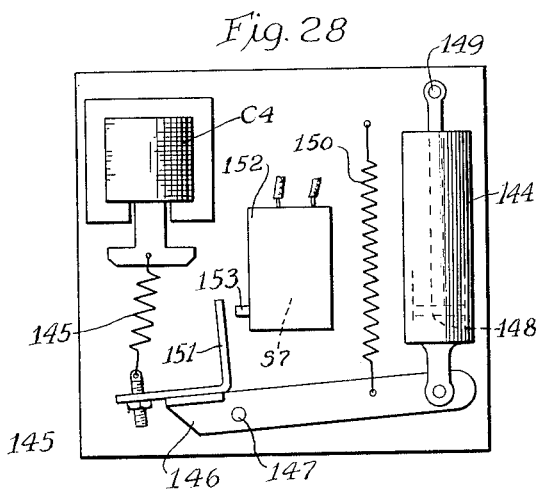
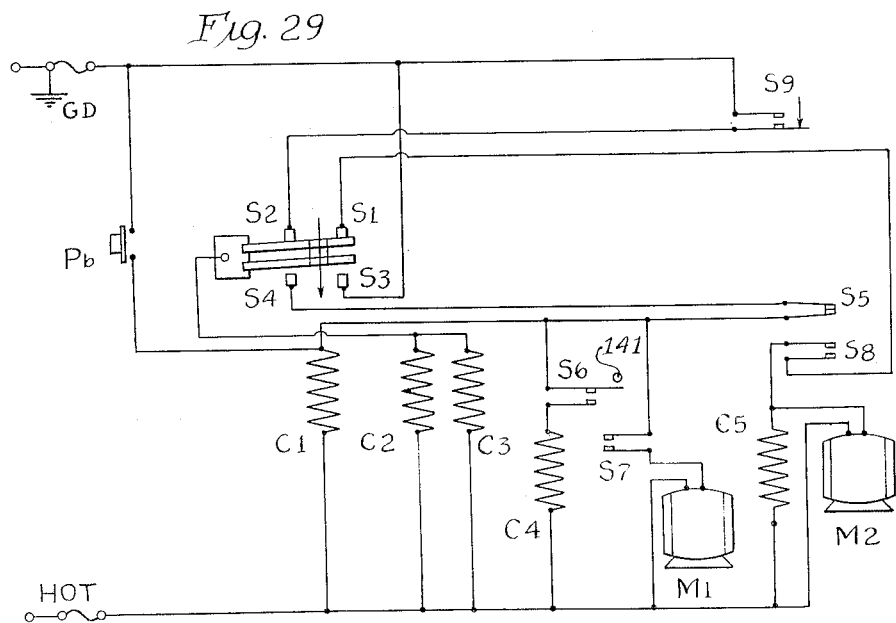
Inventor:
Max E. Brendel
By Roland C. Rehm
   Atty.

Patented Jan. 2, 1945

2,366,432

UNITED STATES PATENT OFFICE 2,366,432

WEIGHING APPARATUS

Max E. Brendel, Chicago, Ill., assignor to Streeter-Amet Company, Chicago, Ill., a corporation of Illinois Application August 3, 1940, Serial No. 350,323

11 Claims. (Cl. 234—5.4)

This invention relates to weighing apparatus and, among other objects, aims to provide simple, efficient and reliable weight recording apparatus which does not impair the accuracy, sensitiveness or speed of the weighing apparatus.

The nature of the invention may be readily understood by reference to one apparatus embodying the invention and illustrated in the accompanying drawings.

In said drawings:

Fig. 2 is an elevation (taken from the side opposite that of Fig. 1) on an enlarged scale and partly in section, of the weighing and weight recording apparatus, the weighing apparatus being represented simply by the tip of a conventional scale beam;

Fig. 3 is an enlarged view of mechanism for engaging the load responsive member in setting the weight recording mechanism;

Fig. 4 is a similar view showing a subsequent position of the mechanism in engagement with the load responsive member;

Fig. 5 is a section taken along the line 5—5 of Fig. 3;

Fig. 6 is a fragmentary view similar to Fig. 2 but on a larger scale;

Fig. 7 is a similar view showing a subsequent position of the mechanism for engaging the load responsive member;

Fig. 8 is an exaggerated diagram illustrating the function of the contour on the contact element of the recorder setting mechanism to eliminate any substantial error on account of angularity of the load responsive member;

Fig. 9 is a sectional elevation taken on plane 9—9 of Fig. 10 of mechanism for locking the load responsive member;

Fig. 10 is a bottom plan section taken on the plane 10—10 of Fig. 9;

Fig. 11 is a section of a portion of Fig. 10 showing the cam device for operating the locking means in locking position;

Fig. 12 is an elevation of the weight recording mechanism;

Fig. 14 is a section of details of the weight recording mechanism on the plane 14—14 of Fig. 12;

Fig. 15 is a section taken on the plane 15—15 of Fig. 12 showing the actuating device for setting the recording mechanism;

Fig. 16 is a section taken on the plane 16—16 of Fig. 12 showing a brake for holding the recording mechanism;

Fig. 18 is an elevation of a portion of the recorder setting mechanism showing the device for controlling the recording operation;

Fig. 19 is a sectional elevation of a dash-pot device in the recorder setting mechanism;

Fig. 20 is a similar section showing the dash-pot in a different phase of its cycle of operations;

Fig. 27 is a fragmentary plan section taken on the plane 27—27 of Fig. 12, showing on an enlarged scale a portion of the recording setting mechanism illustrated in Fig. 13;

Fig. 28 is an elevation of a timer switch; and

Fig. 29 is a diagram illustrating the control circuits.

Figure 1:
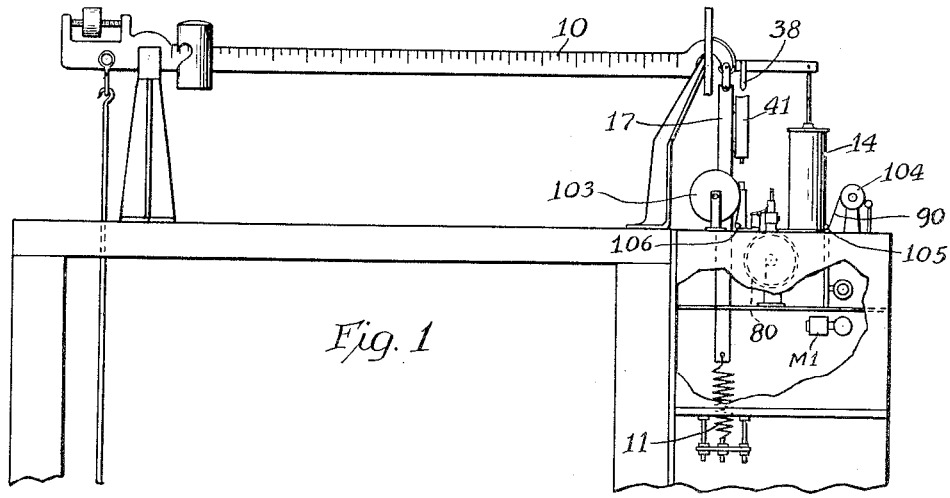
Fig. 1 is a general front elevation of the apparatus.

The invention is here shown embodied in a weighing device having a load responsive member movable to a position representing the weight of the load on the scale. The weight recording mechanism is operated independently of the load responsive member which functions simply to serve, after it has reached load indicating position, as a means for setting the weight recording mechanism. The load responsive member is, therefore, entirely unburdened with any weight indicating or weight recording mechanism. As a result the inertia of the system is greatly reduced, thereby providing greater speed in addition to greater sensitivity and accuracy.

Heretofore efforts have been made to embody these principles in commercial scales but each has encountered difficulty in utilizing the load balance position of the load responsive member to set the weight recording mechanism. Inaccuracies in recorded weight have inevitably resulted for various reasons, among others impossibility of locking the load responsive member exactly in load balance position and slight displacement of the load responsive member from its position during setting of the weight recording mechanism.

In the illustrative apparatus the load responsive member is locked accurately in position representing the load, and the weight recording mechanism is set by means which cause no displacement of the load responsive member and, therefore, no inaccuracy in the recorded weight.

The weighing mechanism is here represented by conventional scale and lever system (not shown) connected with a load responsive member in the form of a beam 10. The load counterbalancing means is represented by spring 11. A spring possesses substantial advantages over pendulum and similar load counterbalancing means in reduction of inertia and increase in speed of the system. The present spring is advantageously made of a material whose spring properties are not changed by variations in temperatures, thereby eliminating thermostatic means for keeping the spring at a uniform temperature. One form of spring of this character is known on the market as the Chatillon spring made from material having the trade-name of Iso-elastic-steel. The spring is advantageously formed of two helical sections 12 and 13 coiled oppositely to neutralize the tendency of the spring to twist or rotate axially as it elongates or contracts. The position of the beam 10 or other load responsive member, therefore, indicates or serves as an index of the weight of the load. Dash-pot mechanism 14 is connected with the load responsive member to damp out oscillations of the system and to bring the load responsive member quickly to load balance position. Because the scale system actuates no load indicating or recording mechanism and, therefore, has a relatively low inertia, the dash-pot may be designed to damp out oscillations much more quickly, without producing inaccuracy, than in a system burdened with load indicating and recording mechanism.

The mechanism for locking the load responsive member in a position representing the weight of the load is here represented by opposite electrically operated clamping devices 15 and 16 which in this instance function to clamp or lock a bar 17 pivotally connected to and movable with the beam 10. The bar 17 is advantageously roughened as shown at 18 by a series of shallow rectangular grooves 19 extending exactly transversely of the direction of movement of the bar and the clamping members are advantageously faced with a slightly resilient material 20 such as automobile brake lining to permit secure gripping of the bar 17. The clamping members 15 and 16 are mounted on guides in the form of rods 21 and are movable in a direction exactly transversely of the movement of the bar 17. They are held by rods 21 against any movement in the direction of the bar. The sides of grooves 19 are perpendicular to the face of the bar and, therefore, do not present any surfaces to the clamping devices which might tend to cam the bar out of load indicating position. The guide rods 21 are supported in bearings 22 mounted on a rigid support in the form of a bracket 23 by which the rods 21, and therefore the clamping members 15 and 16, are held against any movement in the direction of bar 17. The clamping members are normally held apart, that is, out of engagement with the bar 17 by spreader springs 24, and they are moved into clamping engagement by an operating device in the form of a cam 25 (see Figs. 9 and 11) located between and operating to spread apart plunger members 26 and 27 connected respectively with clamping members 15 and 16. As here shown, plunger member 27 is connected directly to clamping member 16 which is slidable (by means of bearings 28). Plunger member 26 is connected to a cross-head 29 and through the guide rods 21 to the cross-head 30 adjustably connected to clamping member 15. The aforesaid adjustment is provided by set screw 31 by means of which the spacing 32 between the clamping member and the bar 17 may be adjusted to equal that between the bar 17 and the clamping member 16. The latter spacing is determined by the position of cam 25. Such spacing should be sufficient to avoid any interference with the free movement of bar 17 but close enough to facilitate prompt clamping of the bar in load balance position.

Thus, when cam 25 spreads apart plungers 26 and 27, clamping members 15 and 16 are respectively moved toward, and clamp bar 17 against, longitudinal movement. This is important because even slight longitudinal displacement of bar 17 would result in an erroneous weight record.

Cam 25 is oscillated to engage clamping members 15 and 16, in the present instance by solenoid C2 whose link 33 is connected to rock arm 34 mounted on shaft 35 carrying cam 25. The latter shaft is carried in bearings 36 mounted on bracket 23. Upon deenergization of coil C2, spring 37 restores cam 25 to initial position and springs 24 then separate or retract clamping members 15 and 16.

The setting stop on the load responsive member is in this instance represented by a finger 38 (rigidly connected to the beam 10) whose point 39 serves as the index or stop for the recording mechanism. The use of a stop separate from bar 17 avoids the possibility of twisting the latter in its clamps upon engagement of the recorder setting mechanism. Bar 17 being pivotally connected (through a link) to the beam and clamped only in one region is much more susceptible to a slight disturbance than the beam itself which is held adjacent one end by bar 17 and adjacent the other by the pivot or knife edge. In this connection it should be remembered that displacement of bar 17 of even so slight an amount as .001 of an inch would be capable of producing some error in the recorded weight.

Since index point 39 of the setting member travels in an arc of a circle (indicated with exaggerated curvature in the dotted line 40) and the setting member 42 has only linear travel, a compensating member 41 is interposed between the index stop 39 and the recorder control or setting member 42 to compensate for angularity. The surface 43 which is brought into engagement with point 39 is given a contour which corrects for the slight errors caused by the arcuate path of the beam and index point 39. This is illustrated diagrammatically in Fig. 8 wherein successive positions of the beam and engagement of the point 39 with the surface 43 are separately illustrated. The upper and lower positions of the beam represent respectively the full load and zero load positions. In these extreme positions the angular travel of the beam is greater per unit load than in the intermediate positions. Since setting of the recorder mechanism is based on linear movement of the control member through distances exactly proportional to the load, non-proportional movement is avoided by giving the surface 43 a concave contour to compensate for the slightly proportional movement of the index point 39.

The compensating device 41 is carried by bar 17 in such a way as to permit the slight relative movement occasioned by contact point 39 with different portions of the surface 43. The supporting means are here shown in the pair of brackets 44 having elongated guide slots 45 which permit relative vertical movement. Since the bar 17 has a slight lateral travel due to angularity of the beam and, therefore, correspondingly laterally shifts the compensating member 41, the design of contour 43 should take such lateral movement into account.

The weight recording mechanism is so connected with the recorder control member 42 that the position of the latter determines the load recorded. Various forms of recording mechanism may be employed. That here illustrated and later generally described is disclosed in detail in my Patent No. 2,040,072. After the load responsive member has been clamped in position representing the weight of the load, the recorder control member 42 is advanced until its movement is arrested by the index point 39. The recording mechanism, whose movement is proportional to that of control member 42, thus exhibits and records a figure (the weight of the load) determined by the position of index point 39.

To avoid errors due to displacement of the index point by impact of the control member 42 as well as errors due to lost motion in its actuating mechanism and in the recorder mechanism, control member 42 is moved toward its index point always in one direction. Such movement is controlled to reduce impact with the setting point to a negligible amount and also to offset variations in such impact (however slight) due to variation in distance travelled by control member 42 in reaching index 39.

The impact controlling means is here shown in the form of a dash pot 46 whose piston 47 is actuated by rod 48 extending longitudinally through the tubular sleeve 49 of the control member and projecting beyond its end in the form of a head 50 adapted to engage the tip 51 of the compensating member 41. Head 50 is normally resiliently projected slightly beyond the end of sleeve 49 by a light spring 52; the latter serves to elevate the dash pot piston 47 in the dash pot to the position illustrated in Fig. 20. Upon contact of head 50 with the tip 51, dash pot piston 47 is moved in the dash pot cylinder. During the first part of its stroke the oil is by-passed through a relatively large by-pass orifice 53 to create only slight initial resistance. Toward the end of its stroke the piston skirt cuts off by-pass inlet 54 at which time its upper end uncovers by-pass orifice 55. The latter is more restricted than by-pass 53 and, therefore, offers correspondingly greater resistance to movement of the piston. Almost at the end of the piston travel, its skirt cuts off the restricted by-pass inlet 56. At this time the head 50 has been pushed into sleeve 49 until it is arrested by engagement thereof with its upper end as illustrated in Fig. 4. Control of the resistance offered to the dash pot piston is regulated by the large and small by-pass needle valves 57 and 58 respectively.

On its return or idle stroke (effected by spring 52) the oil pressure above the piston separates the latter from valve 59 (against the pressure of light spring 60) to uncover the large orifices 61. The latter are, of course, closed on the active stroke.

Figure 13:
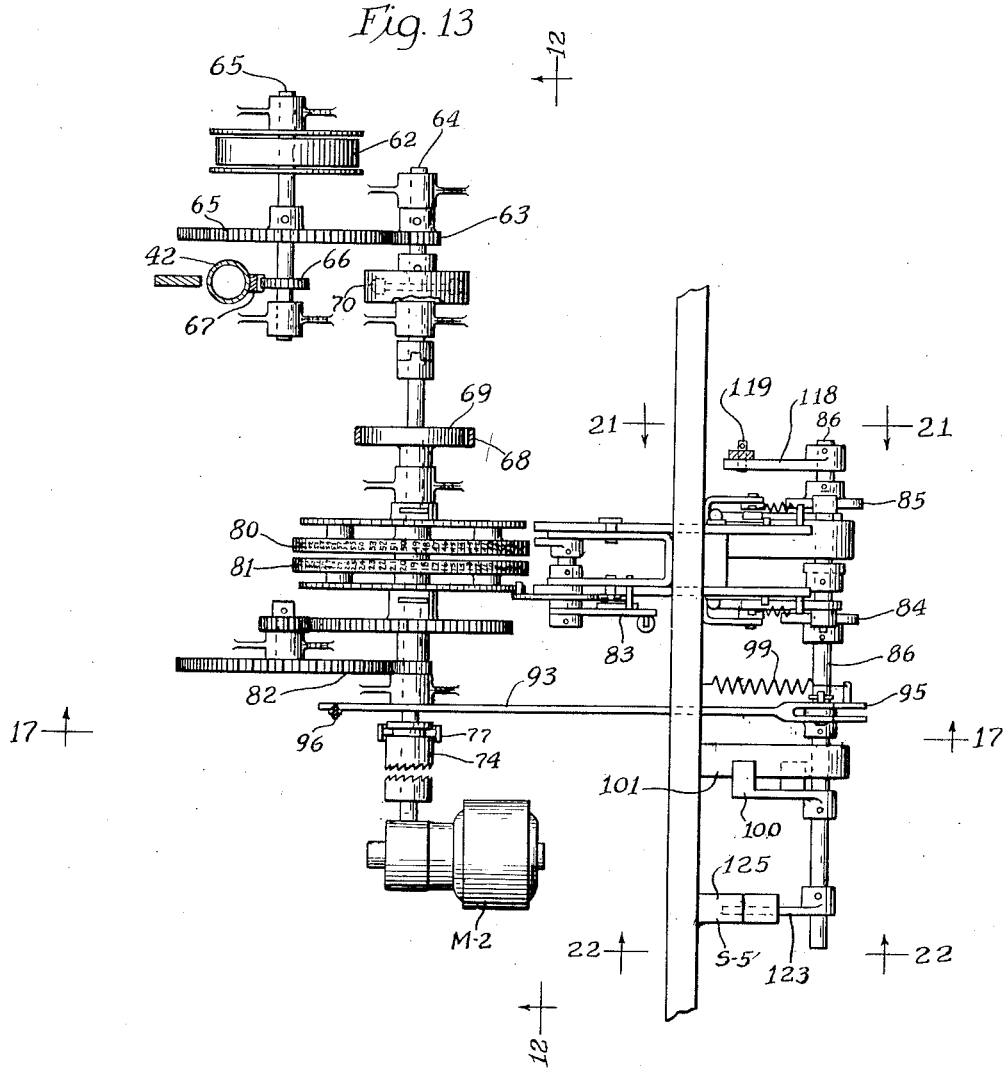
Fig. 13 is a plan view of the weight recording mechanism and the devices for setting the same.

The resilient advance of the recorder control member 42 into operative engagement with the load responsive member is effected in this instance by a driving spring in the form of a spiral clock spring 62 (see Figs. 13, 15 and 27). The latter is connected, through a gear train represented by pinion 63 on shaft 64 in mesh with a large gear on spring shaft 65, with mechanism (presently described) for periodically energizing it. Pinion 66 which operates rack 67 on control member 42 is in this instance directly mounted on spring shaft 65 (Fig. 13). Prior to each recording operation and after it has been wound or energized, spring 62 is held in such condition by a device represented by brake band 68 and brake drum 69 on shaft 64 (Figs. 12, 13 and 16). Upon release of the brake, the spring rotates shaft 65 and advances the recorder control member 42 until it is arrested by the load responsive member in position representing the weight of the load. The rate of advance of control member 42 is advantageously limited and controlled by a friction ball governor 70 (Fig. 15) which reduces the kinetic energy of the control member 42 and its associated mechanism. The governor is of conventional type comprising a stationary interior cylindrical brake surface 71 and governor brake elements 72 pressed against the brake surface by light springs and centrifugal force.

The inertia of the control member 42 and its associated moving elements serves to minimize the effect of the greater spring strength at the beginning of its operation, with the result that the impact of the control member 42 against the load responsive member does no appreciably vary for short and long travel.

The means for rewinding or energizing the spring following each recording operation is here represented by the motor M2 periodically connected with shaft 64 by means of clutch 74. The clutch engaging means are here shown in the form of an operating solenoid C5 connected by link 76 with a clutch yoke lever 77. Spring 78 normally holds the clutch disengaged and operates to disengage the same upon deenergization of solenoid C5 (Fig. 12).

Shaft 64 also operates the weight exhibiting device forming part of the weight recording mechanism. Any appropriate recording mechanism may be employed. That here employed for purposes of illustration is disclosed in detail in my Patent No. 2,040,072 and will be described herein only sufficiently to identify the various elements in my aforesaid patent. The weight exhibiting means are represented by a pair of type wheels 80 and 81 corresponding to type wheels 61 and 62 of my patent. The specific type arrangement employed on the wheels depends of course upon the capacity of the particular scale on which the apparatus is used and upon the weight increments. Type wheel 80 is driven directly by shaft 64 and wheel 81 by shaft 64 through a train 82 of reduction gearing at a rate having a definite, generally a decimal, ratio to the travel of the fast type wheel 80. The type wheels are so adjusted on shaft 64 that when the latter is brought to rest in weight indicating position pursuant to the operation of the recorder setting device 42 the type wheels exhibit the weight of the load.

Associated with the type wheels is mechanism outlined at 83 in Fig. 13 which aligns the type exactly in printing position. This is desirable because the load on the scale almost never comprises whole units, with the result that without aligning mechanism the printing type representing the weight units would not be aligned exactly in printing position. The aforesaid mechanism 83 also includes devices for preventing register of an improper digit in printing position when the fast wheel is in a critical position, that is, in the region of a zero on the fast wheel 80. This mechanism is illustrated and described in detail in said Patent No. 2,040,072, and, therefore, need not be described in detail here. The mechanism 83 is actuated by cams 84 and 85 on control shaft 86 (Fig. 13). This mechanism corresponds to that illustrated in Fig. 21 of my aforesaid patent.

Figure 17:
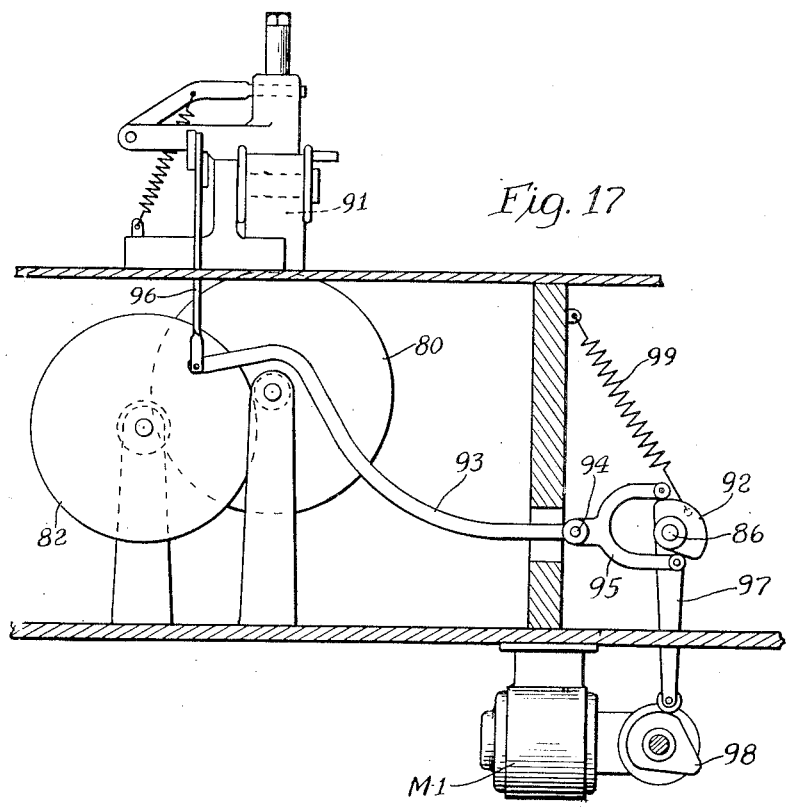
Fig. 17 (on Sheet 1 of the drawings) is an elevation taken from the plane 17—17 of Fig. 13 of the printer actuating mechanism.

The weight of the load is advantageously imprinted on an appropriate record (here shown in the form of a continuous printing tape 90) by means of a printing hammer 91. Any appropriate printing and printing ribbon feeding mechanism may be employed. That here illustrated generally is disclosed in detail in my Patent No. 2,065,362. The printing hammer and ribbon feeding mechanism is actuated by cam 92 on control shaft 86 through lever 93 pivoted at 94 (Fig. 17). Lever 93 is provided with a yoke 95 embracing cam 92. The opposite end of the lever is connected with operating link 96 (corresponding to link 25 in my Patent No. 2,065,362).

The movement of control shaft 86 is in the present instance oscillating, the oscillating mechanism being shown in the form of a cam lever 97 (operated by cam 98) and a spring 99. The latter is connected to a lever arm on shaft 86 and serves to rotate shaft 86 on its return travel. A stop lever 100 on shaft 86 serves by engagement with stop 101 to limit the amplitude of oscillation of control shaft 86.

Cam 98 is in this instance rotated through appropriate reduction gearing by motor M1 (Fig. 17).

Any appropriate record or record tape feeding mechanism may be employed. That here illustrated comprises a tape supply roll 103 and feeding and rewind roll 104. Guide rolls 105 and 106 serve to guide the record tape past printing position and in proper relation to the printing wheels and the printing ribbon.

Figure 21:
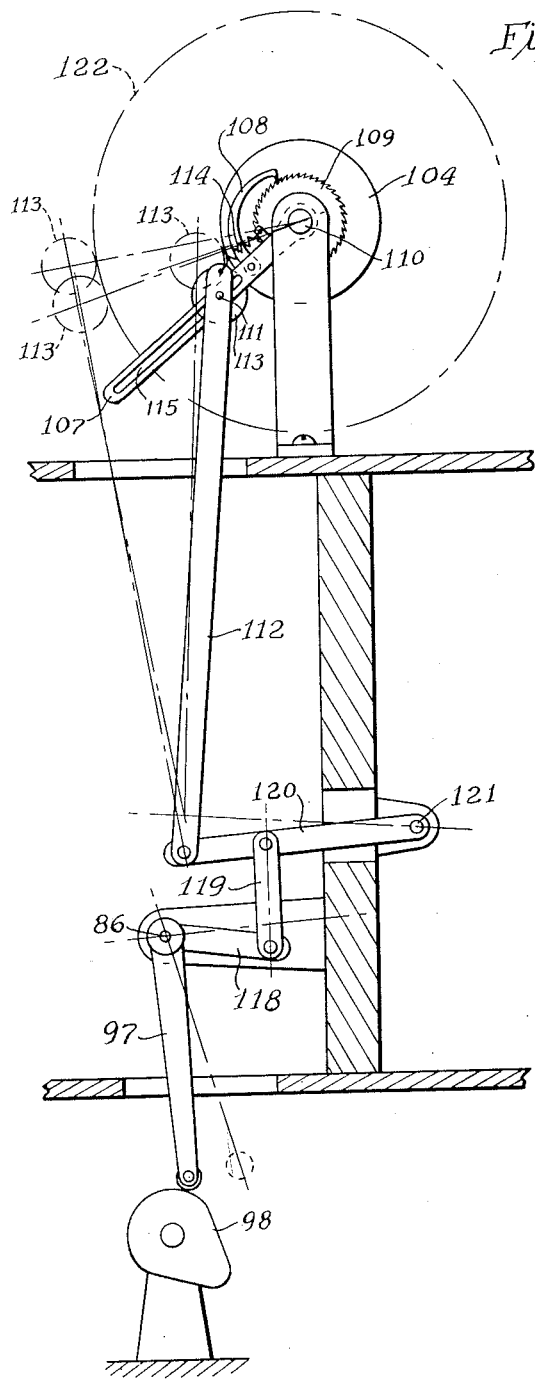
Fig. 21 is a sectional elevation taken on the plane 21—21 of Fig. 13 showing the winding and feeding mechanism for the recorder tape.

In Fig. 21 mechanism for operating the tape rewind roll is illustrated. Such mechanism comprises an oscillating pawl arm 107 carrying a pawl 108 adapted to engage a ratchet 109 on rewind roll shaft 110. To give the tape a uniform linear advance (as distinguished from variable advance produced by a uniform angular rotation of the rewind roll) pawl arm 107 is given a uniform linear movement instead of a uniform angular movement. In the present instance, this is effected by shifting the point 111 of operative engagement of the actuating link 112 with the pawl arm as the tape rewind roll increase in diameter. The pivot point 111 is shifted in the present instance by means of a roll 113 carried on the pivot 111 and held against the surface of the rewind roll by spring 114. As the rewind roll increases in diameter the pivot 111 is moved outwardly along slot 115 in pawl arm 107. Thus the printing tape is advanced a uniform distance for each printing operation regardless of increase in diameter of the rewind roll. Operating link 112 is given a uniform linear movement by a rock arm 118 carried on control shaft 86. To increase the linear travel of link 112 over that obtainable directly from cam 98, the movement of arm 118 (on shaft 86) is transmitted by link 119 to an elongated swinging arm 120 pivoted at 121 and connected to the end of link 112. The reduction in angular movement of pawl arm 107 as the rewind roll increases in diameter is diagrammatically illustrated in Fig. 21. When the roll is of small diameter the pivot 111 is closer to the center of oscillation of pawl arm 107 and, therefore, gives the latter a larger angular movement than when the roll is of a larger diameter, as indicated in dot and dash lines 122. This varies the number of ratchet teeth traversed by pawl 108, depending upon the diameter of the roll, and, therefore, prevents increase in advance of the tape as the rewind roll increases in diameter.

In Fig. 29 is illustrated a wiring diagram adapted for manual control of the recording operation. Electric power is supplied from a source (not illustrated) through the hot side of the line, the other side being shown grounded. Pressing of the push button Pb energizes control coil C1 (Figs. 23 to 26) to close contacts S3 and S4 and to open contacts S1 and S2. The push button circuit through solenoid coil C1 comprises the hot side of the line, coil C1, the push button and the ground Gd. Closing of contacts S3 and S4 establishes a holding circuit for solenoid coil C1 to maintain energization of the latter, thus requiring only a momentary closing of the push button switch. The holding circuit extends from the hot side of the line through coil C1 through contacts S5 (Fig. 22) through contacts S4 and S3 to ground.

Figure 22:
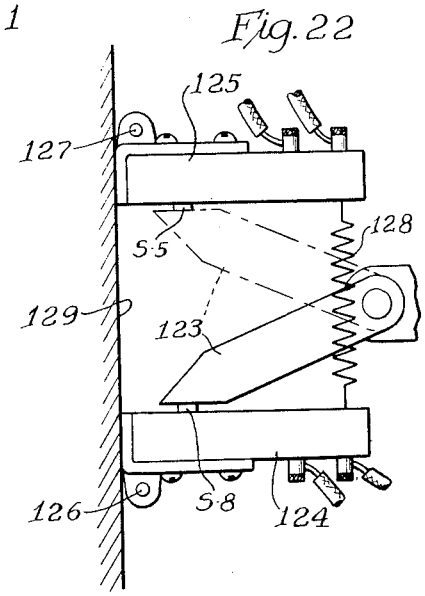
Fig. 22 is a sectional elevation taken on the plane 22—22 of Fig. 13 showing a control switch.

Contacts S5 as well as contacts S8 (whose purpose is hereinafter described) are controlled by a switch arm 123 mounted on the oscillating control shaft 86 (Figs. 13 and 22). Contacts S5 and S8 are here shown in the form of micro switches 124 and 125 hinged at 126 and 127, respectively, and resiliently drawn together by spring 128. Contacts S5 are normally closed, opening upon engagement of arm 123; and contacts S8 are normally open, closing upon engagement of arm 123. Engagement with the supporting surface 129 limits the inward movement of the switches. The spring 128 and the hinged mounting permits them to absorb surplus travel of switch arm 123 after engagement with the respective micro switch push buttons. As shown in Fig. 22 switch arm, at the beginning of the cycle, is in engagement with contacts S8, contacts S5 being closed. The subsequent position of switch arm 123, brought about by oscillation of shaft 86, is illustrated in dot and dash lines, in which position normally closed contacts S5 as well as contacts S8 are open.

Closing of contacts S3 and S4 also closes the circuit through the clamp operating solenoid C2 (Fig. 9) and brake release solenoid C3 (Fig. 16). Operation of the clamps occur after the system is in load balance position.

The brake is normally held engaged by spring 130 operating through lever 131 pivoted at 132. The free end of the brake band 68 is connected to the lever at 133 and the releasing solenoid C3 is connected thereto at 134 by link 135. The brake is, therefore, normally engaged and is released only during energization of solenoid C3.

Upon release of brake 68 the setting member 42 is driven resiliently by clock spring 62 until operative engagement is made with the index point of the load responsive member. Upon such engagement switch contacts S6 are closed. During this operation motor clutch 74 (Fig. 12) is open and the operation of spring 62 is, therefore, not hampered by the inertia of motor M2. This switch is here shown in the form of a micro switch 136 pivotally mounted at 137 upon a bracket 138 carried and movable with the setting member 42 (Fig. 18). The bracket also carries pivoted at 139 a switch operating arm 140 which engages a portion of the load responsive mechanism at or upon contact with index point 39. In the present instance, pin 141 carried on bar 17 serves this purpose. Upon such contact, switch operating arm 140 depresses the switch button 142 and closes contacts S6. It will be understood that only a very minute movement of switch button 42 is required for closing the contacts in a micro switch. Excess movement is absorbed by pivoting of the switch 136 about its pivot 137 against the tension of a light spring 143.

Closing of contacts S6 inaugurates operation of the recording mechanism. In the present instance a time interval is advantageously provided to insure full advance of setting member 42 to the limit of its travel. The timing mechanism is here represented by a solenoid C4 (energized by closing of contact S6) and a retarding device in the form of a dash pot 144 for delaying closing of contacts S7. As illustrated in Fig. 28, solenoid C4 is connected through spring 145 with switch operating arm 146 pivoted at 147. The opposite end of operating arm is pivotally connected to dash pot 144. In the present instance the arm is connected to the dash pot cylinder 148, the dash pot piston being connected to a stationary pivot 149. A light spring 150 serves to return the dash pot to initial position when the solenoid is deenergized. Upon energization, the solenoid simply extends or pre-tensions spring 145 and the latter slowly oscillates switch operating arm against the resistance of the dash pot until contact finger 151 closes contacts S7. The latter contacts are here shown in the form of a micro switch 152 whose push button 153 is engaged by contact finger 151.

Closing contacts S7 energizes the printer operating motor M1 through a circuit passing from the hot side of the line to M1, through contacts S7, normally closed contacts S5, and through S4 and S3 to the grounded side of the line.

As described above, motor M1 not only operates the printing mechanism but oscillates control shaft 86 through a single complete cycle for each cycle of operation of the motor (Fig. 17).

Figure 23:
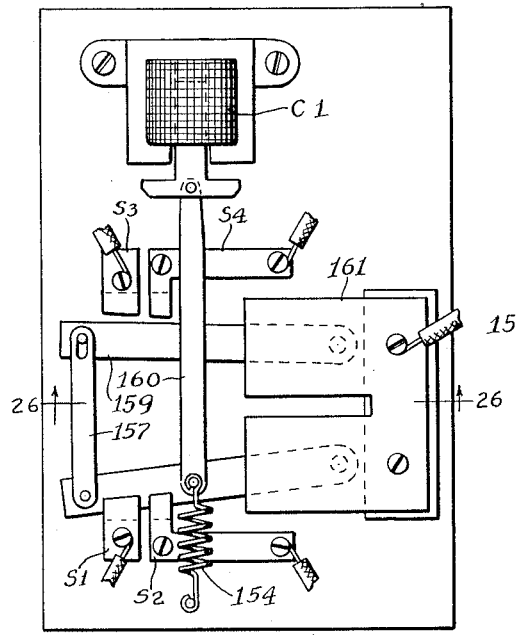
Fig. 23 is an elevation of a control switch and its operating solenoid.
Figure 24:
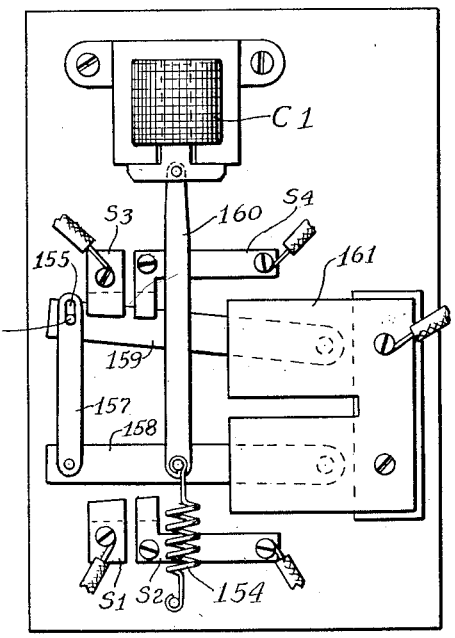
Figs. 24 and 25 are similar views showing the switch in different phases of its cycle of operation.
Figure 25:
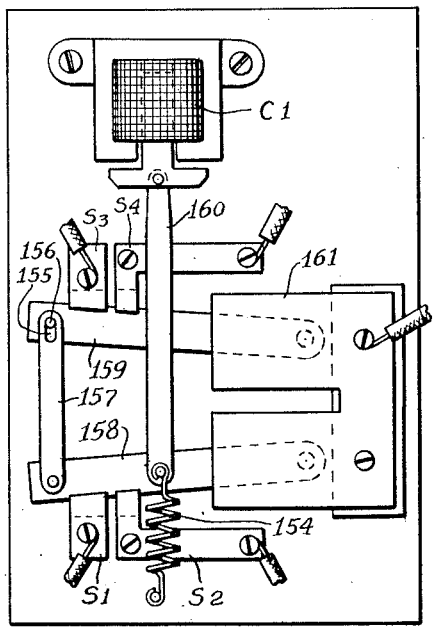
Figure 26:
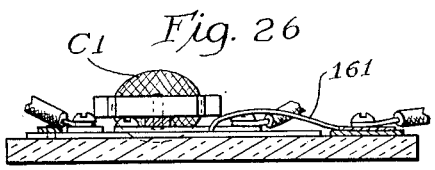
Fig. 26 is a cross-section taken on the plane 26—26 of Fig. 23, illustrating a detail of the control switch.

It should be noted that initially closed contacts S5 control the circuits through three units, namely, solenoid coil C1, timer operating solenoid C4 and motor M1. Shortly after motor M1 starts, switch contacts S5 are opened through rotation of contact arm 123 (Fig. 22), thereby deenergizing solenoid coils C1 and C4 and stopping motor M1. Spring 99 subsequently serves to return contact arm to its initial position. Deenergization of coil C1 causes the opening (by spring 154) of contacts S3 and S4 and closing of contacts S1 and S2. The switch unit illustrated in Figs. 23 to 25 is designed to delay opening of contacts S3 and S4 until contacts S1 and S2 are closed. This action maintains current flow through coils C2 and C3. The secondary circuits through coils C2 and C3 passes from the hot side of the line through contacts S2 and S9 to the ground.

The sequential closing and opening of the contacts as aforesaid is effected in the present instance by providing a lost motion connection in the form of a slot 155 and pin 156 in the link 157 operatively connecting switch arms 158 and 159. Return spring 154 is directly connected only to switch arm 158 (as is solenoid C1 through link 160) and thus closes contacts S1 and S2 before the lost motion connection of link 157 to switch arm 159 operates to open contacts S3 and S4. The aforesaid sequence of operations is illustrated in Figs. 25 and 23. To prevent accidental movement of switch arm 159 a friction spring 161 bears against switch arms 158 and 159. This friction spring also serves as a conductor forming part of the circuit from solenoid coils C2 and C3 to contact S2.

When printer operating motor M1 is energized as explained above and moves rock shaft 86, arm 123 leaves (and therefore permits the opening of) contacts S8 and shortly thereafter engages and opens contacts S5. Opening of contacts S5 deenergizes motor M1, coils C1 and C4, the former bringing about opening of contacts S3 and S4, and closing contacts S1 and S2 and the latter resulting in opening of contacts S7 (Fig. 28). Before motor M1 stops, it has carried the high point of cam 98 beyond lever 97 and spring 99 then functions to rock shaft 86 in the reverse direction and to return arm 123 to its initial position (Fig. 22) to close contacts S8, energizing circuits through motor M2 and clutch solenoid C5. These circuits travel from the hot side of the line through motor M2 and coil C5 (in parallel), contacts S8, contacts S1, S2 and S9 to the ground. This operation returns control or setting member 42 to zero position and at the same time rewinds driving spring 62 and also returns the recorder type wheels 80 and 81 to zero.

When the zero or no load position is reached, member 42 opens contacts S9 (Fig. 2). The latter contacts are normally closed and are here embodied in a micro switch 162 hinged at 163 to its supporting bracket. The switch operating arm 164 is also pivoted at 163 and extends into the path of the returning member 42. Engagement of the latter with the operating arm depresses the micro switch contact 165, opening contacts S9. A spring 166 permits the micro switch to yield to absorb excess movement of setting member 42. The latter is advantageously provided with an adjustable contact point 167.

Opening of contacts S9 deenergizes motor M2 and coils C2, C3 and C5. This effects complete deenergization of the entire circuit. The deenergization of brake coil C3 permits application of the brake which serves to hold the setting member and the recorder type wheels in zero or no load position. The brake also holds the actuating spring 62 in rewound or energized condition. Until the push button Pb is again pressed momentarily to energize coil C1, the system remains in no load position with the control circuits completely deenergized. In this connection it should be noted that the ground side of the circuit is broken both at the push button Pb, contacts S3 and S9.

After the clamping solenoid C2 has been energized to hold the load responsive member in load indicating position, the load on the scale may be removed and another placed thereon without interfering with the subsequent recording operation. In other words, the interval consumed by the recording operation may advantageously be employed (if speed of operation be important) in removing one load from the scale and applying another.

The apparatus, therefore, is of particular utility where speed of operation is important and also in cases where vibration is likely to interfere with recording operation. After the system has come to balance and is held in load balance position by the clamping device, vibration cannot introduce error into the recorded weight. On truck scales, for example, the truck may leave the scale platform after the system has been clamped in load balance position without disturbing the recording operation despite the heavy vibrations which accompany movement of the load from the scale platform. The same applies to other moving loads, such as cars in a moving train passing over the scale platform.

Obviously the invention is not limited to the details of the illuustrative apparatus since these may be variously modified. Moreover it is not indispensable that all features of the invention be used conjointly since various features may be used to advantage in different combinations and subcombinations.

Having described my invention, I claim:

1. Weighing apparatus comprising in combination a member movable to a position representing the weight of a load, weight recording apparatus including printing means movable to a position to print the weight of a load, a reciprocable setting device operatively connected with said printing means and movable into engagement with said movable member to set said printing means to print the load represented by said movable member, a rotating shaft for advancing said setting device into engagement with said movable member, a spiral spring connected with said shaft for rotating the latter, power means operable after recording of a load for rotating said shaft to rewind said spring and for returning said setting device to initial position, and means operated by said setting device on its return to initial position for stopping said power means and for holding said spring in rewound condition.

2. Weighing apparatus comprising in combination a single member movable to a position representing the weight of a load, weight recording apparatus including printing means movable to a position to print the weight of a load, a setting device movable in the direction of movement of said single member operatively connected with said printing means and movable into engagement with said movable member to set said printing means to print the load represented by said movable member, said setting device comprising a sleeve and a contact head resiliently projecting from said sleeve, said head being movable into said sleeve to the limit of its travel on engagement with said movable member, and means for advancing said setting device into engagement with said movable member.

3. Weighing apparatus comprising in combination a load responsive member movable to a position representing the load, a clamping device for holding said member in said position, weight recording mechanism including a setting device movable into engagement with said load responsive member to set said weight recording mechanism, resilient means for moving said setting device, a control device operated upon said engagement for actuating said recording mechanism to record the weight of the load, power means for re-energizing said resilient means and returning said setting device to initial position, and means actuated upon said return to stop said power means.

4. Weighing apparatus comprising in combination a swinging load responsive member movable to a position representing the weight of a load, weight recording mechanism, reciprocable setting mechanism movable into engagement with said load responsive member for setting said recording mechanism, said setting mechanism being movable equal distances for successive units of weight, and a compensating device associated with said setting mechanism for eliminating error in setting said recording mechanism on account of angularity of said swinging load responsive member.

5. Weighing apparatus comprising in combination a load responsive member movable to a position representing the weight of a load, means for momentarily holding said load responsive member in load representing position, mechanism for printing the weight of the load in digits including a printing wheel rotatable through a plurality of revolutions in traversing the capacity of the weighing apparatus, an oscillatable setting device controlling the weight exhibited by said printing mechanism in response to the degree of movement of said setting device toward said load responsive member, resilient means for moving said setting device into contact with said load responsive member and proportionally operating said printing mechanism to exhibit the weight corresponding to the position of said setting device, and means for returning said setting device and printing mechanism to initial position to energize said resilient means.

6. Weighing apparatus comprising in combination a member movable to a position representing the weight of a load, weight recording apparatus including printing means movable to a position to print the weight of a load, a setting device operatively connected with said printing means and movable in generally the same direction as said movable member into engagement with said movable member to set said printing means to print the load represented by said movable means, low inertia means for moving said setting device into engagement with said movable member, means for gradually retarding the advance of said setting device including an extensible member engaging said movable member substantially in advance of the load indicating position of said setting device and movable by the latter to a predetermined retracted position as the setting member reaches its load indicating position, said low inertia means having power not substantially exceeding the retarding force of said retarding means so as to minimize shock on said engagement, and means for returning said setting device to zero position after recording of the weight.

7. Weighing apparatus comprising in combination a member movable to a position representing the weight of a load, weight recording apparatus including printing means movable to a position to print the weight of a load, a setting device operatively connected with said printing means and movable in generally the same direction as said movable member into engagement with said movable member to set said printing means to print the load represented by said movable means, resilient low inertia means for moving said setting device into engagement with said movable member, means for gradually retarding the advance of said setting device including an extensible member engaging said movable member substantially in advance of the load indicating position of said setting device and movable by the latter to a predetermined retracted position as the setting member reaches its load indicating position, said low inertia means having power not substantially exceeding the retarding force of said retarding means so as to minimize shock on said engagement, and means for returning said setting device to zero position and for reenergizing said resilient means after recording of the weight.

8. Weighing apparatus comprising in combination a member movable to a position representing the weight of a load, weight recording apparatus including printing means to print the weight of a load, mechanism for locking said movable member in said position, a setting device operatively connected with said printing means and movable into engagement with said movable member to set said printing means to print the load represented by said movable means, low inertia resilient means for moving said setting device into engagement with said movable member, and a governor for preventing acceleration of movement of said setting device under impulses of said resilient means so that a uniform force is exerted on said engagement regardless of the distance traveled by said setting device.

9. In weighing apparatus the combination comprising a member movable to a position representing the weight of the load, weight recording mechanism including printing means movable to a position to print the weight of the load, a setting device operatively connected with said printing means and movable substantially in the line of movement of and into engagement with said movable member and arrested thereby to set said printing means to print the load represented by the position of said movable member, light weight resilient means for moving said setting device into engagement with said movable member, mechanism for recharging said resilient device following each operation thereof, and means for disconnecting said mechanism from said resilient device following recharging thereof to reduce inertia during the operation of said resilient means.

10. Weighing apparatus comprising in combination an oscillatable member having an amplitude of oscillation representing the capacity of the weighing apparatus and movable to a position representing the weight of the load, means for momentarily holding said oscillatable member in load representing position, mechanism for printing the weight of the load, a setting device movable substantially in the line of movement of said oscillatable member and controlling the weight exhibited by said printing mechanism in response to the degree of movement of said setting device toward said oscillatable member, a spring for resiliently moving said setting device into contact with said oscillatable member and proportionately operating said printing mechanism to exhibit the weight corresponding to the position of said setting device, means for limiting the momentum of said setting device toward said oscillatable member, and means for reenergizing said spring and returning said setting device and printing mechanism to initial position.

11. Weighing apparatus comprising in combination an oscillatable member having an amplitude of oscillation representing the capacity of the weighing apparatus and movable to a position representing the weight of the load, weight recording apparatus including printing means movable to a position to print the weight of a load, oscillatable setting means operatively connected with said printing means and movable substantially in the line of movement of and into engagement with said oscillatable member through a distance representing the weight of the load to set said printing means to print the load represented by the position of said oscillatable member, means for holding said oscillatable member during operation of said setting means, operating mechanism for moving said setting means in the reverse direction including a spring energized by said reverse movement for resiliently advancing said setting means into engagement with said oscillatable member, and means for limiting the maximum movement of said setting means toward said oscillatable member.

MAX E. BRENDEL.